United States Patent
Blight et al.

(10) Patent No.: US 7,660,702 B2
(45) Date of Patent: Feb. 9, 2010

(54) MONITOR FOR AN INFORMATION TECHNOLOGY SYSTEM

(75) Inventors: Jeffrey Blight, Windsor (GB); Graham Castree Charters, Southampton (GB); Amanda Elizabeth Chessell, Alton (GB); Michael Friess, Baden-Württemberg (DE); Pete Stretton, Chandler's Ford (GB); Vernon Maurice Green, Newbury (GB)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 11/289,075

(22) Filed: Nov. 29, 2005

(65) Prior Publication Data

US 2006/0150155 A1    Jul. 6, 2006

(30) Foreign Application Priority Data

Dec. 23, 2004    (GB)    ................................. 0428118.4

(51) Int. Cl.
*G06F 9/44* (2006.01)
(52) U.S. Cl. ................................. 702/186; 705/1; 705/2; 705/8; 707/100; 709/204; 719/318; 717/124
(58) Field of Classification Search ................. 702/186; 340/572.1, 539.13, 573.4, 539.1, 573.1, 539.12; 705/1, 2, 8; 707/100; 709/204; 719/318; 717/124
See application file for complete search history.

(56) References Cited

U.S. PATENT DOCUMENTS

| 6,954,148 B2 * | 10/2005 | Pulkkinen et al. ........ 340/572.1 |
| 2002/0138571 A1 * | 9/2002 | Trinon et al. ................. 709/204 |
| 2002/0170035 A1 | 11/2002 | Casati et al. |
| 2003/0037263 A1 | 2/2003 | Kamat et al. |
| 2003/0097286 A1 | 5/2003 | Skeen |
| 2003/0097345 A1 | 5/2003 | Upton |
| 2003/0115078 A1 | 6/2003 | Young |
| 2003/0126181 A1 * | 7/2003 | Young ......................... 709/100 |
| 2003/0191679 A1 | 10/2003 | Casati et al. |

(Continued)

FOREIGN PATENT DOCUMENTS

WO    WO0127752 A1    4/2001

OTHER PUBLICATIONS

W.M.P. Van Der Aalst, et al Workflow Mining: A Survey of Issues and Approaches, Data & Knowledge Engineering, Amsterdam, NL, vol. 47, No. 2, Jan. 1, 2003, pp. 237-267.

(Continued)

*Primary Examiner*—Carol S Tsai
(74) *Attorney, Agent, or Firm*—David A. Mims, Jr.

(57) ABSTRACT

The present invention provides a means of monitoring the progress of an IT implementation of a process or activity through a defined set of situation types and event objects corresponding to said situation types whereby, if the IT implementation of the process or activity is changed, provided the event objects corresponding to the defined situation types are still generated by the new IT implementation or are able to be derived from the new IT implementation through mapping and/or the instrumentation of new events, the monitor is able to receive or retrieve said event objects and thus perform its monitoring function. This has the advantage of de-coupling the monitor from the specific IT implementation of the process or activity and thus allows a generic monitoring solution to be provided.

14 Claims, 4 Drawing Sheets

U.S. PATENT DOCUMENTS

| | | | | |
|---|---|---|---|---|
| 2005/0171833 | A1* | 8/2005 | Jost et al. | 705/10 |
| 2005/0283445 | A1* | 12/2005 | Trinon et al. | 705/75 |
| 2006/0064486 | A1* | 3/2006 | Baron et al. | 709/224 |
| 2006/0074714 | A1* | 4/2006 | Aziz et al. | 705/2 |
| 2006/0106825 | A1* | 5/2006 | Cozzi | 707/100 |
| 2006/0123101 | A1* | 6/2006 | Buccella et al. | 709/223 |
| 2006/0184473 | A1* | 8/2006 | Eder | 706/20 |
| 2006/0224400 | A1* | 10/2006 | Chkodrov et al. | 705/1 |
| 2006/0242651 | A1* | 10/2006 | Zielinski et al. | 719/318 |

OTHER PUBLICATIONS

P. Muth et al. "Workflow History Management in Virtual Enterprises Using a Light-Weight Workflow Management System", Research Issues on Data Engineering: Information Technology for Virtual Enterprises, 1999. RIDE-VE '99 Proceedings.. Ninth International Workshop on Sydney, NSW, Australia Mar. 23-24, 1999, Los Alamitos, CA, USA, IEEE Comput. Soc. US, Mar. 23, 1999, pp. 148-155.

* cited by examiner

MONITOR FOR AN INFORMATION TECHNOLOGY SYSTEM

FIELD OF THE INVENTION

The present invention concerns a monitor for an information technology (IT) system.

BACKGROUND TO THE INVENTION

An enterprise IT system comprises a network of IT infrastructures such as desk top terminals, servers, routers and databases and a plurality of software applications executed by the components of the system to implement enterprise business processes. An enterprise IT system may comprise an interconnection of many remote components and/or systems belonging to a plurality of enterprises rather than wholly belonging to a single enterprise and may be connected through private networks and/or public networks such as the Internet. Whatever form an IT system takes, it requires the sharing of data between applications being implemented within the system.

At the heart of an enterprise IT system is a means enabling the systematic sharing of data between applications. International Business Machines (IBM) Corporation established the WebSphere MQ system (WebSphere is a trade mark of IBM), formerly known as the MQSeries system, as the basis for modern message based data exchange systems. The MQSeries system is a Message Oriented Middleware (MOM) system that comprises queuing software whereby messages are moved point to point between applications. A sending application dispatches a message to a queue manager which provides assured delivery to its final destination.

IBM now provides the WebSphere Business Integration (WBI) Server system as an enterprise application integration solution which ties together disparate applications through the use of a message management system (message broker) together with application adapters, routing, transformation and business workflow. The message broker is one example of a runtime environment which is responsible for executing message flows. The primary role of the message broker is to execute the business logic defined in such message flows. Applications send and receive messages to and from the broker. The broker routes the messages using rules defined in the message flows and transforms the data into the structure required by a receiving application.

In conventional IT systems, a monitor provided with the system monitors IT infrastructures such as application servers, web servers and adapters and runtime environments such as workflow engines and message brokers, for example, through event objects that may be produced by said IT infrastructures. An event object may comprise data representative of many different types of information indicative of such things as a time stamp relating to the processing of a message flow or activity, an identifier for the event object or IT information identifying the IT system or systems that are running, information concerning the nature or content of data 10 being processed, for example. An application creating the event, the event source, passes the event object to an event infrastructure including an event log and an optional catalogue. The event infrastructure passes the event object onto event consumers, i.e. applications that have expressed an interest in receiving the event object. The event infrastructure may also store the event object in the event log, where it can be later retrieved along with other potentially related events.

In conventional IT systems, the event log defines the structure of the event objects produced by applications and IT system components. This comprises a description of the format of the event data produced by the IT system implementation and is therefore tied to that implementation. The monitor monitors the implementation of business processes and provides measurements derived from the event objects. However, since the content of each event object is tied to the IT system implementation, the monitor must be modified each time the IT system implementation is changed. This results in brittle monitoring solutions making it impossible to provide generic monitors of a reasonable level of sophistication. As IT systems are being increasingly integrated, it is desirable to provide a means of obtaining a total process monitoring view which is decoupled from the specific IT system implementation.

OBJECT OF THE INVENTION

It is an object of the invention to mitigate and/or obviate problems associated with monitors in conventional IT systems.

It is another object of the invention to provide a method of decoupling a process monitor implementation from the specific IT system implementation thereby enabling a monitoring implementation to be utilised 40 with different IT system implementations.

SUMMARY OF THE INVENTION

In a first main aspect, the present invention provides a method of monitoring the implementation of a process by an information technology IT) system, comprising the steps of: generating respective event records for a number of predefined activities associated with said process; and at a monitor, receiving event records for a predefined set of said number of predefined activities; and processing said received event records to determine measurements indicative of implementation of said process.

In a second main aspect, the present invention provides a monitor for an IT system for monitoring the implementation of a process by an information technology (IT) system, comprising: means for receiving event records for a predefined set of a number of predefined activities, said number of predefined activities being associated with said process; and means for processing said received event records to determine measurements indicative of implementation of said process.

In a third main aspect, the present invention provides an IT system for implementing a process, said system comprising: a plurality of IT infrastructures for generating respective event records for a number of predefined activities associated with said infrastructures; and a monitor for receiving event records for a predefined set of said number of predefined activities; and processing said received event records to determine measurements indicative of implementation of said process by the IT system.

In a fourth main aspect, the present invention provides a computer readable medium comprising computer code means for the monitor and IT system of the second and third mains aspects of the invention for implementing the method in accordance with the first main aspect.

Further aspects and features of the present invention will be apparent from the appended claims and the accompanying description.

BRIEF DESCRIPTION OF THE DRAWINGS

A description of the present invention will follow with reference to the accompanying drawings, of which.

DETAILED DESCRIPTION OF A PREFERRED EMBODIMENT

The foregoing and further features of the present invention will be more readily understood from a description of a preferred embodiment, by way of example thereof, with reference to the accompanying drawings.

The following description of a preferred embodiment will be generally based on the IBM WebSphere Business Integration (WBI) Server system and the IBM WebSphere Business Integration Message Broker (WBI MB) system, by way of examples. It will be understood that the principles described herein are applicable to any system or application generating events, for example a business process system employing middleware for managing the systematic exchange of data between applications implementing business processes.

Figure 1:
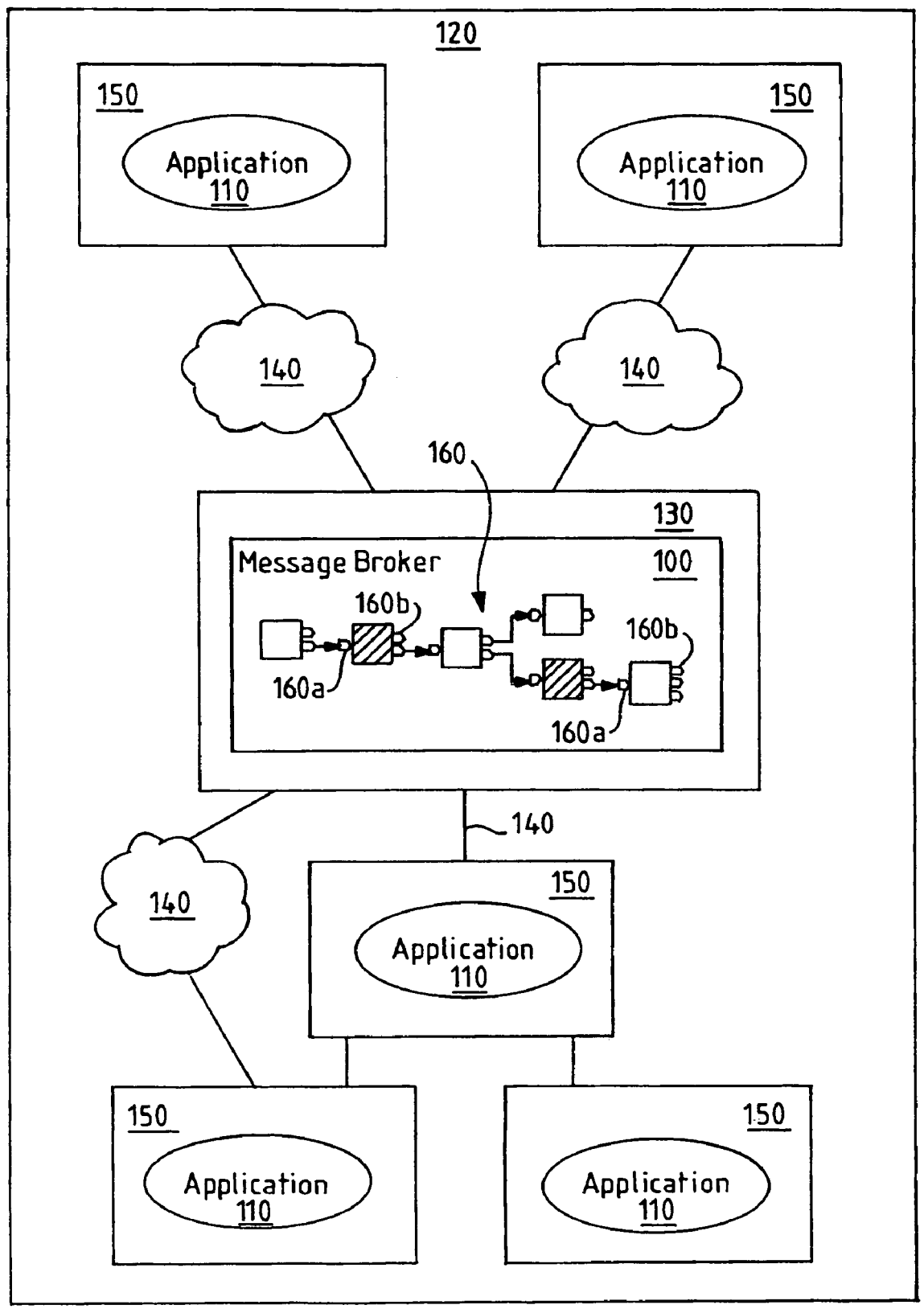
FIG. 1 is a schematic diagram illustrating the logical relationship in runtime of a message broker (MB) with applications being employed by an IT system to implement a business process.

FIG. 1 is a schematic diagram illustrating the logical relationship in runtime of an IT infrastructure such as a message broker (MB) 100 with the applications 110 being employed by an IT system, generally denoted by the numeral 120, comprising a plurality of the same or different IT infrastructures, to implement a business process. The message broker 100, which may comprise IBM's WBI MB v5.0 or WMQI B v2.x, is implemented as program code on a server 130 which is linked through public and/or private networks 140 to application servers, web servers or like systems 150 hosting the various applications employed to implement the business process. A message flow 160 corresponding to an activity comprising a part of a business process is illustrated as comprising a tree of nodes, each node comprising a message of the message flow 160 representative of a part of the business logic comprising the business process. Each node has at least one input 160a but may have a plurality of outputs 160b representative of alternative or parallel processes within the activity. The message broker 100 is a runtime environment that executes the business logic defined in such message flows by passing messages (data) in accordance with rules defined in the message flows between the various applications 110 invoked to perform processing on data. The foregoing logical arrangement of a message broker in runtime as an example of an IT infrastructure with the applications used to implement an activity comprising a part of a business process will be familiar to a skilled artisan and need not be described in greater detail here.

Figure 2:
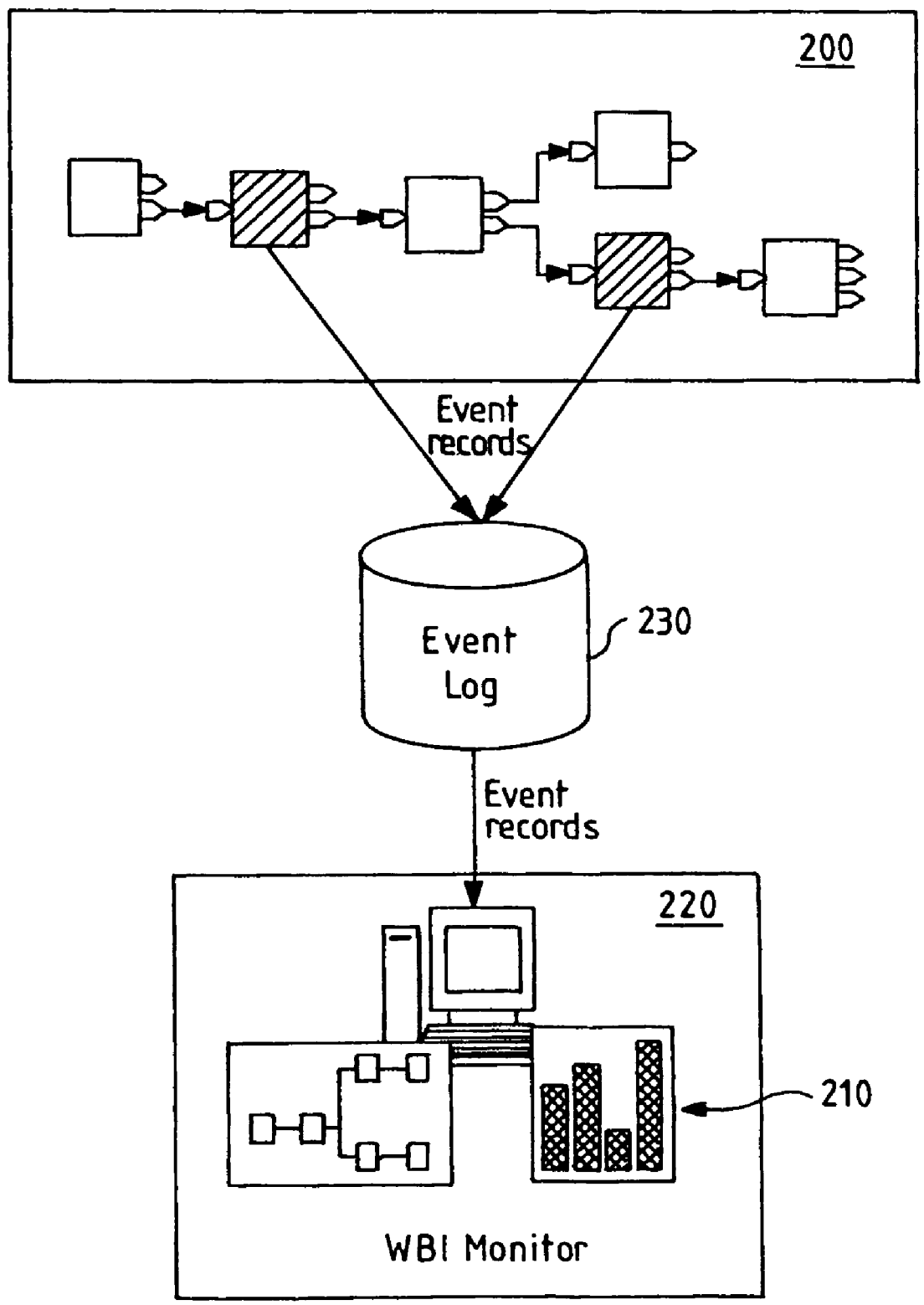
FIG. 2 is a schematic diagram illustrating the logical relationship between an IT infrastructure and a monitor in an IT system.

Referring now to FIG. 2, provided is a schematic diagram illustrating the logical relationship between an IT infrastructure 200 and a monitor 210. The IT infrastructure 200 may comprise a message broker, for example, but could equally comprise any part or component of an IT system that performs data processing in respect of implementing an activity. The IT infrastructure 200 may comprise a component such as an application server but may also only exist as a runtime environment such as a workflow engine, for example.

The monitor 210 functions to monitor the implementation of the business process and to provide measurements relating to such implementation through the mechanism of event objects (records). The monitor may, for example, measure the progress of the implementation and/or determine measures accumulated over a number of process instances. The monitor 210 is also implemented as program code on a server 220 or the like. As the IT infrastructure 200 processes data by way of implementing the business process or more particularly an activity comprising a part of such process, applications 110 invoked to perform processing of data, the middleware 200 itself and the message broker flow produce event objects. These event objects are stored in an event log 230 and are thus available to the monitor 210. The monitor 210 may be passed the event objects as they occur, receive them as required from the event log 230 or may retrieve them through querying the event log 230.

In contrast with conventional IT systems, where the IT infrastructure defines the event log 230 and the structure of the event objects produced either by applications 110 and/or middleware 200 and thus ties the monitor 210 to a specific IT implementation of a business process, the present invention defines a set of specific situations that result in respective event objects being generated. A pattern or set of respective event objects, which may comprise a single event object in some cases, is then defined and the monitor 210 arranged to receive or retrieve the defined set of event objects from the IT infrastructures 200 comprising the IT system 120 and/or the event log 230 in order to perform the functions of monitoring process progress and providing performance measurements. Consequently, even if the IT implementation is changed, provided the defined situations occur resulting in their respective event objects being generated, the monitor 210 can still retrieve or receive and understand the event objects comprising the predefined pattern and thus can perform the same functions of process progress monitoring and measurement performance. The invention enables the monitor 210 to be logically decoupled from the specific IT implementation of the business process thus enabling the same monitor 210 to be utilised with different IT implementations of the business process provided that the predefined set of situations still occur and thus the predefined set of event objects are still generated.

Figure 3:
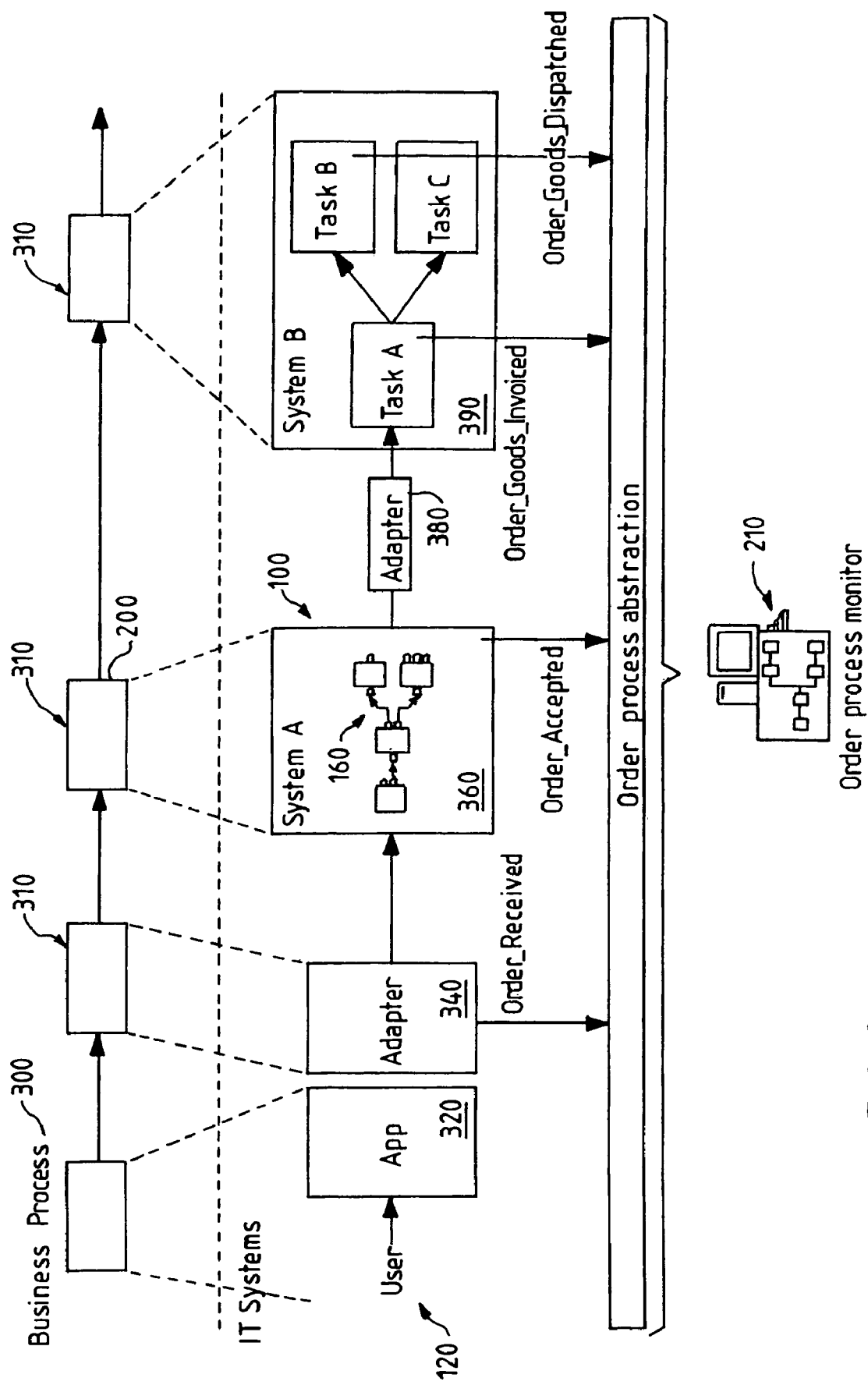
FIG. 3 is a schematic diagram illustrating, as a first example, a logical relationship between an IT system implementation of a business process and a monitoring solution in accordance with the presence invention.

Referring now to FIG. 3, provided is a schematic diagram illustrating, as a first example, a logical relationship between an IT system implementation of part of a business process and a monitoring solution in accordance with the present invention. The business process 300 is broken into a string of activities represented by nodes 310, each node indicative of an IT infrastructure 200 that executes an application to process data to perform its respective activity to implement the process within the IT system or a group of connected IT systems 120 co-operating to implement the business process. It will be understood that, whilst the business process is illustrated as a linear string of nodes 310, in practice, the process could be represented by a graph of nodes indicative of alternative and/or parallel activities comprising the business process. It will also be appreciated that whilst each node 310 is indicative of an IT infrastructure implementing an activity, since an activity typically corresponds to a logical unit of processing, an IT infrastructure could implement multiples activities. In this example, the business process is an order process.

In this example, each node 310 of the business process comprises a respective IT infrastructure 200 for implementing a respective activity. For example, "App" 320 comprises in this illustrative embodiment a user order input application hosted on an application server (not shown) whereby a user can input an order for goods or services at an on-line web based portal, for example. "Adapter" 340 is an adaptation means as familiar to those skilled in the art for changing the format of the data comprising the input order to a format acceptable to other IT infrastructures 200 such as "System A" 360 which in this embodiment comprises a message broker 100 executing a message flow 160. A further "Adapter" 380 transforms data from the message broker 100 to a format acceptable to a next IT infrastructure 200 comprising, in this embodiment, a workflow engine represented as "System B" 390.

In order to monitor order process progress, a set of situations which may result in event objects being generated is defined. In this example, the set of situations, referred to hereinafter as situation types, comprises *Order_Received", "Order_Accepted", "Order_Goods_Invoiced" and "Order_Goods_Dispatched". This set of situation types having respective event objects comprise a set which can be referred to as an Event Set Abstraction (ESA). In practice, an ESA will comprise many more event objects generated for respective situation types including, for example, *Order_Rejected" or *User_Registration_Complete".

The monitor 210 is arranged to receive from the IT infrastructures 200 via the event log 230 (FIG. 2) or to retrieve directly from the event log 230 the set of event objects defined in the ESA thereby enabling the monitor 210 to perform the functions of process progress monitoring and measurement performance on data contained in the event objects. A field in each event object may define its situation type thereby providing the means by which the monitor 210 can recognise the event objects comprising the ESA. Consequently, the underlying IT implementation of the order process can be changed in any way and, provided the event objects supporting the ESA are still generated by the new IT implementation, the monitor 210 is able to still perform its functions of process progress monitoring and measurement performance. For example, the message broker 100 represented by "System A" 360 in this embodiment may be replaced by a different IT infrastructure 200 in a different IT implementation of the order process. However, provided the replacement IT infrastructure still generates an event object comprising the situation type Order_Accepted then the same monitor can be employed for the new IT implementation of the order process. However, if the new IT implementation does not support the event object of the ESA then new events may be instrumented to fill any gaps or existing events mapped to those of the ESA.

For the case where event objects do not contain a field defining that object's situation type, the event infrastructure may include an event mapper for identifying a specific situation type from the event object data and to then map said object to the identified situation type. Thus, the mapper enables legacy event objects, for example, not conforming to the situation types defined for the ESA to be mapped to appropriate ones of the situation types thus enabling the monitor 210 to be used in legacy IT system implementations. The mapper may also be arranged to deal with the mapping of other event object fields such as IT system information or business data, for example.

FIG. 3 is illustrative of a monitor 210 in accordance with the present invention being employed to monitor the implementation of a business process and to thus provide measurements relating to the implementation of said business process. As such, FIG. 3 illustrates the use of the monitor in accordance with the invention from a business process implementation perspective. The monitor can, however, also be employed to monitor an IT system implementation from a technical point as illustrated in FIG. 4.

Figure 4:
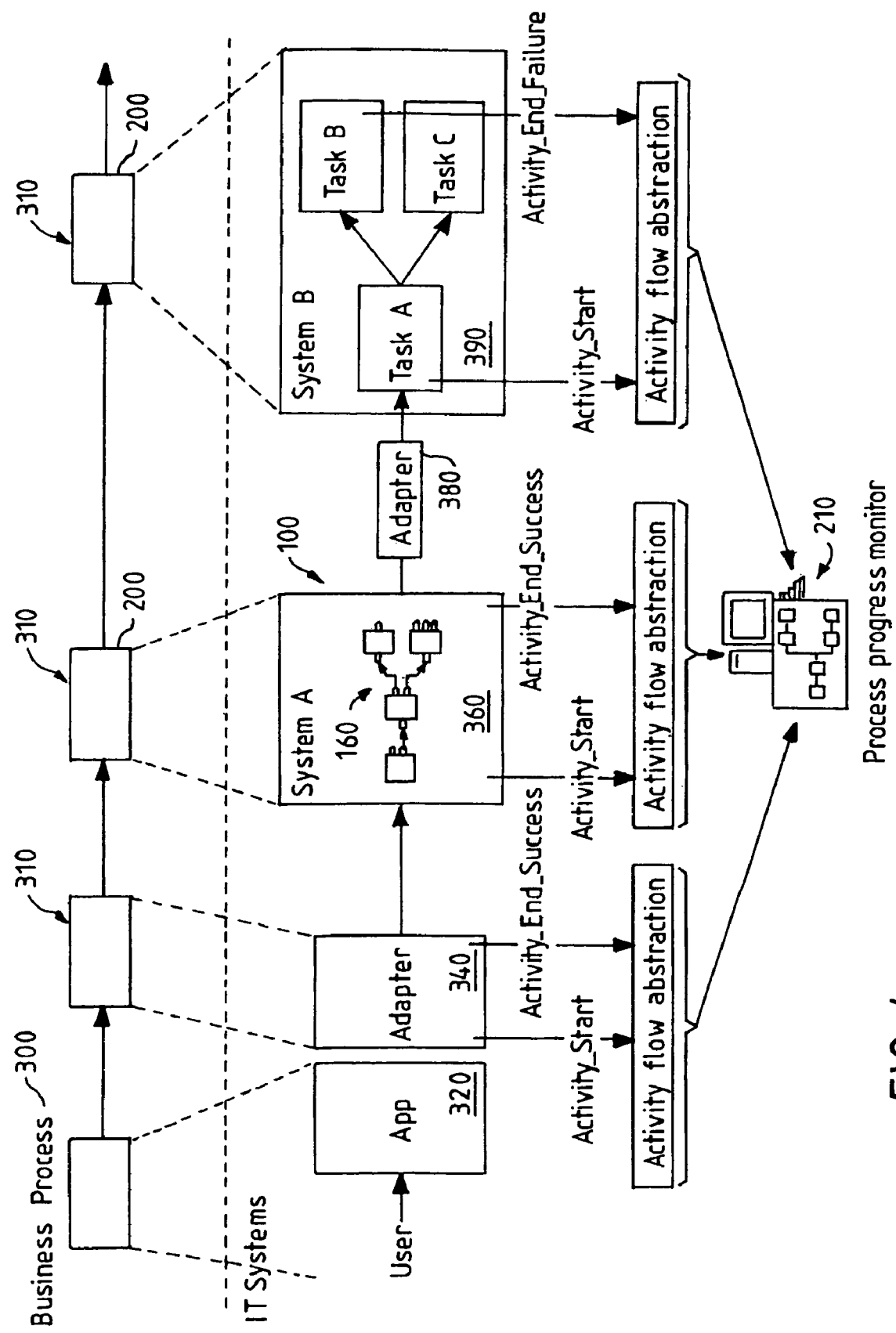
FIG. 4 is a schematic diagram illustrating, as a second example, a logical relationship between an IT system implementation of a set of IT activities and a monitoring solution in accordance with the presence invention.

Referring to FIG. 4, provided is a schematic diagram illustrating, as a second example, a logical relationship between an IT system implementation of a technical activity within an IT system 120 and a monitoring solution in accordance with the presence invention. As with the first example illustrated by FIG. 3, the activity 300 is broken into a string of nodes 310, each node representative of an IT infrastructure for performing some data processing in respect of an activity or sub-activity.

In this example, in order to monitor process progress, a set of situation types comprising a basic, or technically based, ESA is defined for abstractly tracking individual activities rather than the complete business process. The ESA is very basic comprising a selection of just three situation types, namely *Activity_Start", *Activity_End_Success" and *Activity_End_Failure". The monitor is arranged to understand the basic ESA and the progress of any IT infrastructure 200 of the IT system(s) which supports this ESA can be tracked and monitored. As illustrated in FIG. 4, the activity is implemented as three main sub-activities which are each monitored in accordance with the basic ESA. Once again, the IT implementation of the business process may be changed, but the monitor 210 can still perform its functions without being modified to take account of the change in IT implementation provided the event objects supporting the basic ESA are still generated by the monitored sub-activities comprising activity.

The event infrastructure captures event objects which can be retrieved by the monitor 210 or are passed to the monitor 210 by the event log 23 0. The event infrastructure may include a mapper for mapping legacy events to the defined situations of the ESA where such legacy events do not contain any identification of situation type or other event data that is not in an appropriate form.

In summary, the present invention therefore provides a means of monitoring the progress of an IT implementation of a process or activity through a defined set of situation types and event objects corresponding to said situation types whereby, if the IT implementation of the process or activity is changed, provided the event objects corresponding to the defined situation types are still generated by the new IT implementation or are able to be derived from the new IT implementation through mapping and/or the instrumentation of new events, the monitor is able to receive or retrieve said event objects and thus perform its monitoring function. This has the advantage of de-coupling the monitor from the specific IT implementation of the process or activity and thus allows a generic monitoring solution to be provided.

The invention claimed is:

1. A method of monitoring the implementation of a process by an information technology (IT) system, comprising the steps of:

defining a plurality of activities represented by a plurality of nodes associated with said process which result in event records being generated independently of an IT infrastructure, wherein each of said plurality of nodes is indicative of a respective IT infrastructure that executes an application to process data to perform its respective activity;

generating respective event records for the predefined activities associated with said process from a set of situations from associated event objects having fields identifying said set of situations;

at a monitor, receiving the event records for a predefined set of said predefined activities from an event log for said associated event objects having the fields; and processing said received event records to determine measurements indicative of implementation of said process from the fields in said associated event objects.

2. The method of claim 1, wherein an event object includes data identifying a situation type whereby the monitor recognises the situation type as relating to an event object associated with the predefined set of activities.

3. The method of claim 2, wherein the event log includes a mapper for mapping the data of an event object not containing a field identifying a situation type to one of a plurality of situation types associated with the set of predefined activities from event object data.

4. The method of claim 1, wherein an IT infrastructure comprises one of an application server, a web server and a runtime environment.

5. The method of claim 4, wherein the runtime environment comprises one of a message broker and a workflow engine.

6. A monitor for an IT system for monitoring the implementation of a process by an information technology (IT) system, comprising;

means for receiving event records for a predefined set of a number of predefined activities representing a plurality of nodes indicative of a respective IT infrastructure that executes an application to process data to perform its respective activity from an event log, said number of predefined activities being associated with said process; and means for processing said received event records from a set of situations from associated event objects having fields identifying said set of situations to determine measurements indicative of implementation of said process from said fields within said associated event objects.

7. The monitor of claim 6, wherein the monitor is arranged to receive or retrieve the event records for the predefined set of said number of predefined activities from said event log.

8. The monitor of claim 7, wherein the monitor is arranged to recognise a situation type of an event object from data contained in said event object identifying the situation type whereby the monitor recognises the situation type as relating to an event object associated with the predefined set of activities.

9. An IT system for implementing a process, said system comprising:

a plurality of IT infrastructures for generating respective event records for a number of predefined activities represented by a plurality of nodes indicative of one of said plurality of IT infrastructures that executes an application to process data to perform its respective activity associated with said infrastructures; and a monitor for receiving event records for a predefined set of said number of predefined activities; and processing said received event records from a set of situations from associated event objects having fields identifying said set of situations to determine measurements indicative of implementation of said process from said fields within said associated event objects by the IT system.

10. The IT system of claim 9, wherein an event log is arranged to store the event records for the number of predefined activities and the monitor is arranged to retrieve the event records for the predefined set of said number of predefined activities from said event log.

11. The IT system of claim 9, wherein an event object includes data identifying a situation type whereby the monitor is arranged to recognise the situation type as relating to an event object associated with the predefined set of activities.

12. The IT system of claim 11, wherein the event log includes a mapper for mapping the data of an event object not containing a field identifying a situation type to one of a plurality of situation types associated with the set of predefined activities from event object data.

13. The IT system of claim 9, wherein an IT infrastructure comprises one of an application server, a web server and a runtime environment, and wherein the runtime environment comprises one of a message broker and a workflow engine.

14. A computer readable medium comprising computer code means for implementing monitoring the implementation of a process by an Information Technology system, the computer readable medium comprising:

computer code means for generating respective event records for a number of predefined activities represented by a plurality of nodes indicative of one of said plurality of IT infrastructures that executes an application to process data to perform its respective activity associated with said process; and computer code means for receiving at a monitor event records for a predefined set of said number of predefined activities; and computer code means for processing said received event records from a set of situations from associated event objects having fields identifying said set of situations to determine measurements indicative of implementation of said process from said fields within said associated event objects.

* * * * *

UNITED STATES PATENT AND TRADEMARK OFFICE
CERTIFICATE OF CORRECTION

PATENT NO. : 7,660,702 B2
APPLICATION NO. : 11/289075
DATED : February 9, 2010
INVENTOR(S) : Blight et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 848 days.

Signed and Sealed this

Thirtieth Day of November, 2010

David J. Kappos
*Director of the United States Patent and Trademark Office*